F. J. BARGER.
CABLE CLAMP.
APPLICATION FILED JAN. 8, 1917.
1,248,991.
Patented Dec. 4, 1917.
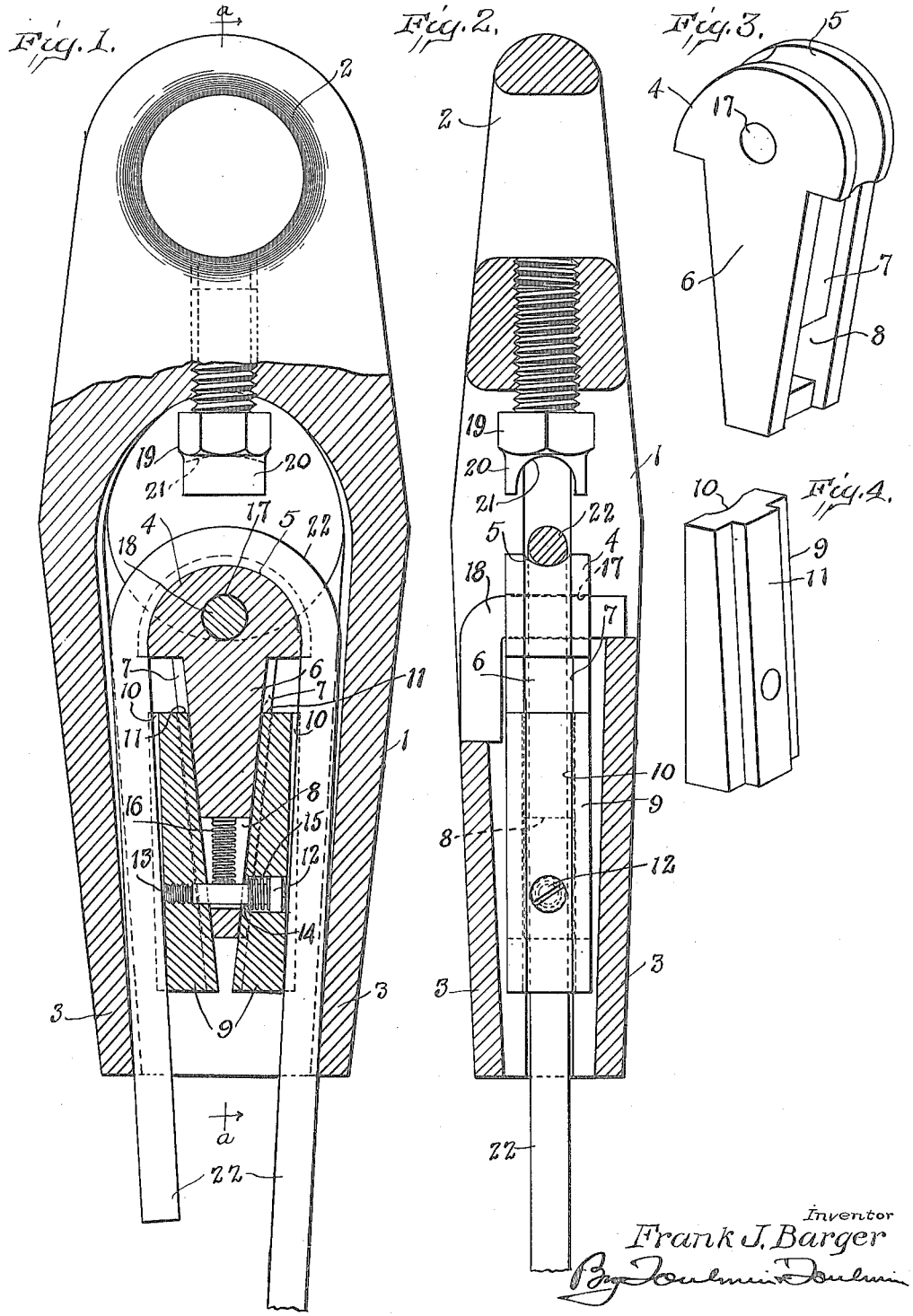
Inventor
Frank J. Barger
Attorneys

UNITED STATES PATENT OFFICE.

FRANK J. BARGER, OF DAYTON, OHIO.

CABLE-CLAMP.

1,248,991.  Specification of Letters Patent.  Patented Dec. 4, 1917.

Application filed January 8, 1917. Serial No. 141,087.

*To all whom it may concern:*

Be it known that I, FRANK J. BARGER, a citizen of the United States, residing at Dayton, in the county of Montgomery and State of Ohio, have invented certain new and useful Improvements in Cable-Clamps, of which the following is a specification, reference being had therein to the accompanying drawing.

My invention relates to cable clamps. In particular, my invention relates to clamps for cables used on drag line buckets, stays and hoisting mechanism, in all of which it is necessary to have some means of connection between sections of cable or between a cable and a stationary point of connection. Heretofore, there has been no ready means of effecting the connection between the cable and a stationary point or between two sections of cable or between an object to be moved and a cable for moving it.

It is an object of my invention to provide a means for so connecting and clamping the above mentioned objects together that the cable may be readily inserted in the cable clamp constituting my invention, may be adjusted in the position desired very quickly, and then the cable may be clamped with absolutely no possibility of slippage and with no possibility of injuring the cable itself by any mashing, grinding or twisting of the cable, which are common in efforts heretofore made to provide cable fasteners or clamps.

It is an additional object of my invention to provide an extended clamping area so that the grip on the cable will be distributed over as large a portion of the cable as possible to distribute the strain and to increase the efficiency of the binding of the cable. It is another object to provide a device which will increase its grip upon the cable with the increase of strain put upon the cable itself so that the greater the necessity for a grip the greater the power of that grip.

In the accompanying drawings, Figure 1 is a side elevation of my cable clamp partly in section; Fig. 2 is a view taken at right angles to Fig. 1 on the line *a—a* showing the frame of my device in section; Fig. 3 is an enlarged view of the T-shaped plug carried on the inside of the frame; and Fig. 4 is an enlarged view of one member of the pair of supplementary sliding members cooperating with the T-shaped plug to form an angular plug within the frame.

In Fig. 1, 1 indicates the frame, 2 indicates the eye of the frame. This eye may have substituted for it any well known means of connection, as for instance, a snap hook, or a hook, etc.

3—3 indicate the arms of the frame within which is located the T-shaped plug 4 which has its horizontal member semicircular in shape having on its outer periphery a groove 5 for the reception of the cable. The vertical member 6 of this T-shaped plug 4 is wider at its portion where it adjoins the cross member than it is at its base, being substantially of a wedge shape. On the sides of this wedge-shaped vertical member of the T-shaped plug 4 are grooves 7. In the trough of the groove 7 is an areaway 8 cut completely through the vertical member of the T-shaped plug near its base for a purpose to be hereinafter described. Coöperating with this vertical member of the T-shaped plug and traveling one each in each groove on each side of said vertical member is a supplementary wedge-shaped plug 9 having on one face a groove 10 for the cable to travel in and rest in and on the other face a shoulder or flange 11 which fits in the groove 7 of the T-shaped plug.

The supplementary members have their outer surfaces with the grooves 10 therein so arranged that the cable will lie neatly in the groove 10 and in the groove 5 without throwing the cable out of alinement or unduly twisting or warping it. Holding the two supplementary plugs 9—9 together is the adjustable screw 12 which is threaded at one end at 13 into the left hand plug and turning freely in the right hand plug. In the right hand plug there is a shoulder 14 between which and the head of the screw 12 is a helical spring 15 which serves to draw the two supplementary members together by reason of its expansion. This screw 12 extends through the aperture 8 in the base of the vertical part of the T-shaped plug, as heretofore described. In this aperture is placed in a vertical position a helical spring 16 having its base resting upon the side of the screw 12 and its top against the ceiling of the aperture 8. The tendency of this helical spring to expand causes the entire structure of the two supplementary wedges and their connecting screw 12 to move downward, limited generally by the bottom of the aperture 8. The utility of this feature will be described hereafter. The T-shaped plug and its cross member has an aperture 17 through which is inserted a locking pin 18 which may be inserted or removed at will. In the frame 1 is threaded an adjustable member 19 with a head 20 having one end cut out in the shape of a semicircular groove 21 for snug engagement with the upper surface of the T-shaped plug. This member is brought in engagement with the upper surface of the plug after it has been adjusted over the T-shaped plug and the supplementary plugs.

22 designates the cable.

The method of attachment and adjustment of this clamp is as follows:

The T-shaped plug has inserted in it the crank 18 which is placed in the position shown in Fig. 2. At the same time the supplementary plugs 9—9 have been assembled, as shown in Fig. 1. The cable is then inserted around the plugs which fit loosely within the frame and are kept from pulling downward into the restricted jaw of the frame by reason of the crank 18 holding them elevated. Prior to inserting the cable the exact width of clearance to be eventually provided between the plugs and the wall of the frame is determined by the adjustment of the screw 12. After the cable is adjusted in its proper position, as shown in Fig. 1, then the crank 18 is revolved and withdrawn so as to allow the plug to move down into the restricted area and bind the cable and then the member 19 is screwed down until the groove 21 comes in contact with the upper surface of the T-shaped plug 4 which prevents the movement of the plug upward, together with the cable and the consequent release of the cable upon any slackening of the tension on the cable and the adjacent parts connected with it.

It will be seen that this device is adjusted to various sizes of cables, is adjustable to the wear of cables and can be used to effect a union between two pieces of cable or between a cable and an object very readily and effectively, even in difficult situations which are the common occurrence in work in which this cable clamp is used.

While I have shown and described one embodiment of my invention it will be understood that the same has been chosen for the purposes of illustration only, and that I do not desire to be limited to the details of construction shown and described, for obvious modifications will occur to a person skilled in the art.

Having thus fully described my invention, what I claim as new and desire to secure by Letters Patent, is:—

1. In a cable clamp, a frame having a means of connection at one portion and an adjustable means of connection in another portion consisting of a wedge-shaped plug coöperating with jaws of said frame to clamp a cable therebetween, whereby as the strain is increased on said cable the clamping of said cable is increased.

2. In a frame having a means of connection to one portion, a pair of jaws in said frame, a wedge-shaped member therebetween and coöperating therewith to clamp a cable, and means for preventing said cable and said wedge from becoming loosened upon the slacking of the cable, whereby as the strain is increased on said cable the clamping of said cable is increased.

3. In a cable clamp, a means of connection at one end of a frame, a pair of jaws at the other end of the frame, a T-shaped plug between said jaws, adjustable means coöperating with said T-shaped plug, a cable coöperating with said jaws and the members therebetween, whereby said cable is clamped between the jaws and the plug.

4. In a cable clamp, a frame, a means of connection at one end, a pair of jaws at the other, a T-shaped plug within said jaws, adjustable members coöperating with said T-shaped plug, means of holding said plug and members in inoperative position for adjustment of a cable around them within the jaws, and means for preventing the movement in one direction of the cable and the plug when the cable and plug are in their finally adjusted position.

5. In a frame, a means of connection at one end, a pair of jaws at the other end of said frame, a T-shaped plug, a semicircular head on said T-shaped plug with a groove on the outer periphery thereof, a groove on each side of the vertical member of said T-shaped plug, a supplementary member with a flange on its inner face and a groove on its outer face being in coöperative relation one each on each side of said vertical member of the T-shaped plug, means of holding said supplementary members in yielding engagement with said T-shaped plug, means to yieldingly hold said supplementary members away from the head of said T-shaped plug, means to hold said T-shaped plug and supplementary members in inoperative position for adjustment of the cable around said plug and supplementary members, and means for preventing the movement of said T-shaped plug and its supplementary members in one direction when said plug and said members are in their operative position, whereby said cable is clamped between the jaws and the plug.

6. In a cable clamp, a frame, a means of connection at one end, a pair of jaws at the other, an adjustable plug between said jaws, removable means of holding said plug in inoperative position, and means of preventing said plug and the cable placed upon said plug between the plug and the jaws for moving in one direction when the cable and plug are in operative position.

7. In a cable clamp, means of connecting said clamp at one end of a frame, a pair of jaws at the other end of said frame, means of preventing the movement of the cable and a plug in one direction carried by said frame, said plug being T-shaped, a semicircular head having a semicircular groove on the outer periphery thereof, an angular groove on the vertical face of the vertical members of said plug, an aperture at the lower end of said vertical member, a pair of coöperating wedge-shaped plugs on one face of each plug, a semicircular groove on the other face, an angular shoulder, said shoulder traveling in and coöperating with the angular groove in the side of the vertical member of the T-shaped plug, an aperture in each of said supplementary plugs, means of holding said supplementary plugs passing through said aperture in the supplementary plugs and the aperture in the vertical member of the T-shaped plug, means of keeping said supplementary members in yielding engagement with the T-shaped plug laterally, means of keeping the supplementary members in yielding engagement with the T-shaped member longitudinally, a cable passed between the jaws of said frame and the T-shaped plug and its supplementary members, said cable lying in the semicircular groove on the outer edges and periphery of said T-shaped plug and supplementary members, means of holding the T-shaped plug and supplementary members in inoperative relation, whereby when this said means is removed the T-shaped plug and supplementary members will move into clamping engagement with said cable and jaws of said frame and said cable will be fixedly clamped.

In testimony whereof I affix my signature.

FRANK J. BARGER.